March 12, 1946.   A. S. KROTZ   2,396,579
VEHICLE SUSPENSION
Filed Jan. 8, 1942   2 Sheets-Sheet 2
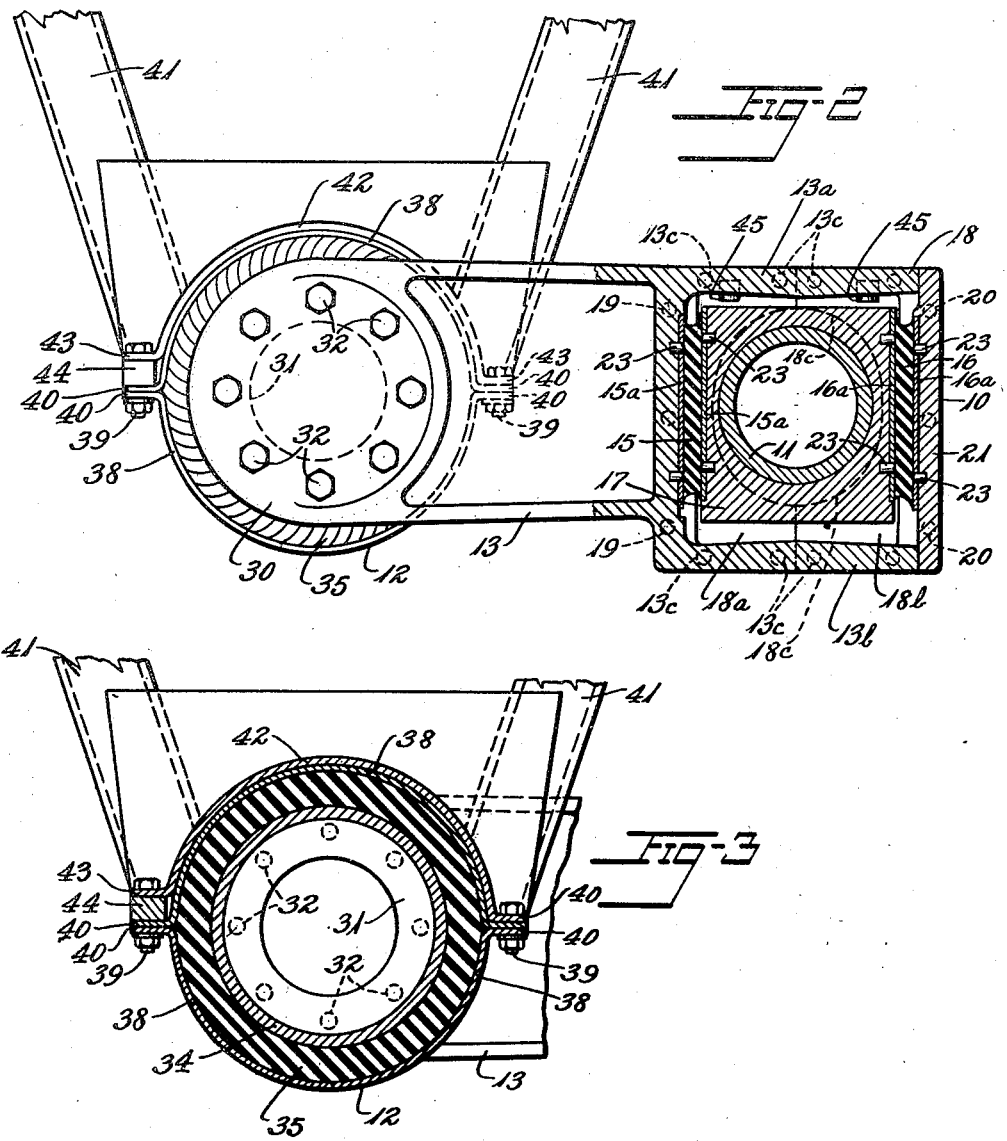

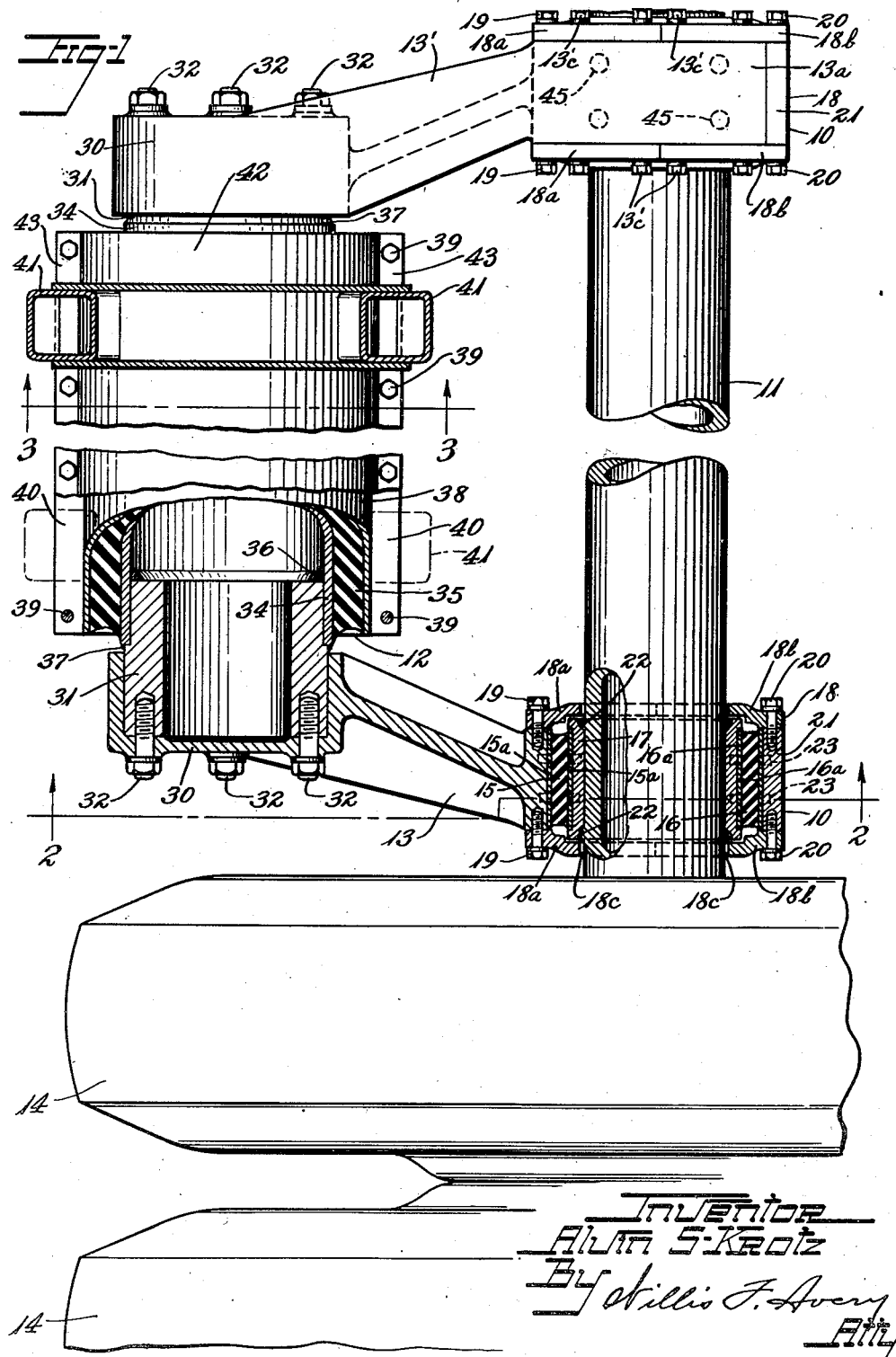

Patented Mar. 12, 1946

2,396,579

UNITED STATES PATENT OFFICE 2,396,579

VEHICLE SUSPENSION

Alvin S. Krotz, Akron, Ohio, assignor to The B. F. Goodrich Company, New York, N. Y., a corporation of New York Application January 8, 1942, Serial No. 426,057

5 Claims. (Cl. 267—21)

This invention relates to vehicle suspensions, and especially to suspensions of the through-axle type for heavy-duty motor vehicles such as trucks and busses, although features of the invention are useful in vehicles of other types, such, for example, as passenger vehicles and rail trucks, including vehicles other than the through-axle type.

Heretofore, in vehicle suspensions for trucks and busses, the springs of the vehicle, if sufficiently stiff to provide cushioning under heavy loads, in many cases have been too stiff for comfortable springing under lighter loads, or if the springing means have been soft enough at light loads for comfortable ride, an undesirably large amplitude of springing movement has been required in order to have springing under heavy loads and in some cases cushioning has been prevented altogether.

The chief objects of the present invention are to provide for effective springing of a vehicle through a wide range of load conditions, and to provide a suspension having relatively soft springing for light loads and stiffer springing for heavier loads. A further object is to utilize effectively in combination the advantages of springs of resilient rubber or other rubber-like material in straight shear and springs of such material in torsion.

Further objects are to provide durability and compactness of structure and to provide for convenience and economy of manufacture.

These and further objects will be apparent from the following description, reference being had to the accompanying drawings in which:

Fig. 1 is a plan view of a vehicle suspension constructed in accordance with and embodying the invention, parts being broken away and sectioned.

Fig. 2 is a section taken along the line 2—2 of Fig. 1.

Fig. 3 is a section taken along the line 3—3 of Fig. 1.

In the illustrative embodiment of Figs. 1 to 3 of the drawings a vehicle suspension is shown as applied, for example, to the rear or driving-end of a heavy-duty truck or passenger bus of the dual rear wheel type. The construction comprises a pair of springs 10, 10 mounted on an axle 11 of the through-axle type and having a relatively soft springing for cushioning the vehicle when empty or under light loads, and relatively stiff springing means, such as a torsion spring 12 secured to the frame or body of the vehicle, for cushioning the vehicle under heavy loads, the torsion spring 12 being connected with the softer springs 10, 10 by swinging arm members 13, 13'. Dual wheels 14, 14 are shown mounted on an end of the axle 11.

The relatively soft springs 10, 10 may comprise any suitable spring construction, but each of these springs preferably comprises two bodies of resilient rubber or other rubber-like material 15 and 16 mounted between an adapter element 17 secured to the axle 11 and a housing structure 18, the rubber-like material 15 and 16 being disposed in a manner such that deflections of the axle 11 are resisted by straight shear stresses in the rubber-like material 15 and 16. The housing structure 18 preferably comprises, for facilitating assembly, two pairs of side-plates 18a, 18a and 18b, 18b, secured to projecting flanges 13a and 13b of the arm member 13 as by means of bolts 13c, 13c. Portions of the housing structure 18 encircling the axle 11 are spaced from the axle 11 as indicated at 18c, 18c, in Fig. 1 and by dotted lines in Fig. 2 to permit relative movement between the axle 11 and the housing structure 18.

The pair of side-plates 18a, 18a of the housing 18 are secured, as by means of bolts 19, 19 to the arm member 13 and the side-plates 18b, 18b of the other pair are secured, as by bolts 20, 20, to an end-plate 21 on the opposite side of the axle 11 from the arm member 13. The adapter element 17 is positioned on the axle 11, as by means of welded portions 22, 22, or by other suitable attaching means. The rubber-like material 15 and 16 is mounted on mounting-plates 15a, 15a and 16a, 16a, which plates are secured between the adapter element 17 and the end face of the arm member 13 and the end-plate 21 in a manner to provide springing of the vehicle by shear stresses in the bodies of rubber-like material 15 and 16.

The rubber-like material 15 and 16 is secured to the plates 15a, 15a and 16a, 16a as by means of a vulcanized bond or by other suitable attaching means and the mounting plates 15a, 15a and 16a, 16a are attached to the supporting members of the housing structure 18 by any suitable means, such for example, as by dowel pins 23, 23.

The shear springs 10, 10 are preferably mounted on the axle 11 close to the wheels to permit independent movement of each spring, as in the cases where one wheel is to rise and fall independently of the other through the limited range permitted.

The ends of the arm members 13, 13 away from the axle 11 have flanged portions 30, 30 adapted to receive hub members 31, 31 and are attached thereto by means of bolts 32, 32 or by other suitable fastening means, the hub members 31, 31 being adapted to receive the torsion spring 12 in fixed relation, optionally adjustable, with respect thereto and to hold the same against any possibility of relative rotation with respect to the arm members 13, 13. An inner shell 34 for receiving a body of rubber or other resilient rubber-like material 35 of the torsion bushing 12 is mounted on the outer surface of the hub members 31, 31 in any suitable manner, as for example, by welding or brazing at the end of the hub members 31, 31 as indicated at 36 in Fig. 1 and at the end of the shell member 34 at 37 in Fig. 1.

An outer shell member is mounted to encircle the body of rubber-like material 35 and is preferably in two sections 38, 38 fastened together as by means of bolts 39, 39 at projecting portions 40, 40 of the sections 38, 38 of the outer shell member. The sections 38, 38 of the circumferentially discontinuous outer shell member permit adjustment of the initial radial compression in the rubber-like material 35 of the torsion bushing 12 by the provision of suitable spacer members between the projecting portions 40, 40, as desired.

The torsion bushing 12 may be secured to the body and frame of the vehicle by any suitable means, as for example, by heavy bracket members 41, 41 secured to an arcuate member 42, which arcuate member 42 has projecting portions 43, 43 adapted to be secured to the bushing at the projecting portions 40, 40 of the outer shell members 38, 38 by means of the bolts 39, 39. Spacer members may be provided between the projecting portions 43, 43 of the arcuate supporting member 42 and the projecting portions 40, 40 of the outer shell members 38, 38 on either side of the torsion bushing 12 to permit adjustment of the initial tilt of the bushing when mounted in the vehicle, as desired, and also adjustment in service. A spacer member is shown incorporated in the assembly at 44 in Figs. 2 and 3. Reinforcing plates suitably secured to the bracket members 41, 41 as by means of welding are provided to add to the strength and rigidity of the structure.

Under springing movement of the vehicle axle 11 with respect to the body, the shear springs 10, 10, having a relatively high deflection for soft springing, provide for cushioning of the vehicle by resisting the relatively small deflections when the initial deflection is slight, as when the vehicle is only lightly loaded. When the vehicle is more heavily loaded, the initial deflection of the axle is relatively large so that the adapter elements 17, 17 of the shear springs 10, 10 are moved into contact with the upper portion of the housing structure 18 of the shear springs 10, 10. Springing deflections of the axle under the relatively greater weight of the loaded vehicle are then resisted and cushioning of the vehicle is provided for by torsional stresses in the resilient material of the torsion bushing 12 which provides stiffer springing as compared to the shear springs 10, 10.

Even under the conditions of the heavier loads, the shear springs 10, 10 are effective to permit differential vertical movements of the connected wheels by virtue of the ability of one wheel to drop with respect to the other. This differential action may be augmented as desired by the design of the torsion spring 12 such that the shaft is permitted some tilting with respect to the outer housing by virtue of the softness of the rubber, the thickness thereof in relation to its length, or both.

The suspension affords desirably soft springing of the vehicle under light loads, and stiffer springing under heavy loads, and this is effected by utilizing advantageously the combined action of rubber springs in straight shear and rubber springs in torsion. The suspension is virtually free from static friction and complete rubber insulation of the body from the wheels is made possible.

In the positions of the parts of Fig. 2, the vehicle is under light loading, for example, with no passengers in the case of a bus, so that movement of the straight shear spring bodies 15, 16 has not reached its limit.

Resilient bumpers 45, 45 may be provided in the shear springs 10, 10 at the points of contact of the elements of the springs under heavy loads, although this is not always essential owing to the double cushioning action of the springs 10 and 12.

Variations may be made without departing from the scope of the invention as it is defined by the following claims.

I claim:

1. A vehicle suspension comprising springing means including relatively stiff torsional springing means of resilient rubber-like material for resisting deflections under heavy loads, a second springing means, and an arm structure for inter-connecting said springing means, said second springing means comprising resilient rubber-like material, relatively soft as compared to the first said springing means, mounted for resisting deflections in straight shear under lighter loads, and said arm structure being mounted to transmit springing movement torsionally to said stiff springing means.

2. A vehicle suspension comprising springing means including relatively stiff springing means of resilient rubber-like material for resisting deflections under heavy loads by torsional stresses in said rubber-like material, a second springing means, a swinging arm structure for inter-connecting said springing means and imposing torsional stress on said rubber-like material, said second springing means comprising resilient rubber-like material, relatively soft as compared to the first said springing means, for resisting deflections under lighter loads by shear stresses in said rubber-like material, and means for limiting deflection of said second springing means and transmitting further deflection to said arm and the first said springing means.

3. In a vehicle having a body and a wheel-mounting structure, a suspension comprising relatively soft springing means of resilient rubber-like material mounted at said wheel-mounting structure for resisting springing deflections of the wheels under light loads by shear stresses in said rubber-like material, means for limiting the flexing range of said soft springing means, a second springing means of resilient rubber-like material, relatively stiff as compared to the first said springing means, disposed between the wheel-mounting structure and the body for resisting springing deflections of the wheels under heavier loads by torsional stresses in said rubber-like material independently of said first springing means, and an arm structure for connecting said first and second springing means.

4. In a vehicle having a body and a through-axle, a suspension comprising relatively soft springing means of resilient rubber-like material mounted at said axle for resisting springing deflections of the wheels under light loads by shear stresses in said rubber-like material, means for limiting the flexing range of said soft springing means, a second springing means of resilient rubber-like material, relatively stiff as compared to the first said springing means, between the axle and the body for resisting springing deflections of the wheels under heavier loads by torsional stresses in said rubber-like material, and an arm structure for connecting said first and second said springing means.

5. In a vehicle having a body and a through-axle, a suspension comprising a spring mounted upon the frame including radially spaced-apart inner and outer generally horizontal members, an arm structure extending from one of said members in the fore and aft direction of the vehicle and a body of resilient rubber-like material between said members and bonded thereto for resisting vertical swinging movement of said arm by torsional stresses in said material, said arm structure having a housing enclosing said through-axle, at least one spring of resilient rubber-like material between said housing and said through-axle, and secured to both in a relation to cushion initial axle deflections by shear stresses in the material, and means for limiting the relative movement of the through-axle and housing for transmitting further axle deflections to said arm structure and first said spring, the second said spring being relatively soft as compared to the first said spring for cushioning axle deflections under light loads.

ALVIN S. KROTZ.